(12) United States Patent
Shaw et al.

(10) Patent No.: US 6,460,660 B1
(45) Date of Patent: Oct. 8, 2002

(54) PARKING BRAKE FOR DRUM TYPE BRAKES WITH ELECTRONIC LINING WEAR SENSOR AND ADJUSTER

(75) Inventors: Schuyler Scott Shaw; Bryan Peter Riddiford, both of Dayton, OH (US)

(73) Assignee: Delphi Technologies, Inc., Troy, MI (US)

(*) Notice: Subject to any disclaimer, the term of this patent is extended or adjusted under 35 U.S.C. 154(b) by 0 days.

(21) Appl. No.: 09/873,102

(22) Filed: Apr. 26, 2001

(51) Int. Cl.[7] ............................................. F16D 51/00
(52) U.S. Cl. ........................ 188/79.56; 188/79.51; 188/162
(58) Field of Search .................. 188/74, 78, 325, 188/79.51, 79.54, 79.56, 79.62, 79.63, 79.64, 156, 157, 158, 161, 162

(56) References Cited

U.S. PATENT DOCUMENTS

| 4,146,117 A | 3/1979 | Kawaguchi et al. |
| 4,623,045 A | * 11/1986 | Evans |
| 5,038,898 A | 8/1991 | Inoue |
| 5,148,894 A | 9/1992 | Eddy, Jr. |
| 5,150,773 A | 9/1992 | Hickey et al. |
| 5,219,049 A | * 6/1993 | Unterborn ................... 188/156 |
| 5,501,305 A | 3/1996 | Stalmeir et al. |
| 5,769,189 A | 6/1998 | Heibel et al. ............... 188/325 |

FOREIGN PATENT DOCUMENTS

JP  56-20842 A  * 2/1981 ............. 188/79.56

* cited by examiner

Primary Examiner—Jack Lavinder
Assistant Examiner—Thomas Williams
(74) Attorney, Agent, or Firm—Robert M. Sigler

(57) ABSTRACT

A parking brake assembly for an automotive drum brake is provided. The parking brake assembly replaces a conventional mechanical strut with an electronic strut actuator subassembly that provides for parking brake engagement and disengagement, sensing of brake lining wear and adjustment of brake shoe-to-drum clearance.

7 Claims, 1 Drawing Sheet

PARKING BRAKE FOR DRUM TYPE BRAKES WITH ELECTRONIC LINING WEAR SENSOR AND ADJUSTER

TECHNICAL FIELD

This invention relates to a leading/trailing type drum brake assembly in which the parking brake lever, adjuster strut and associated components are replaced with a single electronic subassembly that controls the parking brake, senses brake lining wear and adjusts the brake shoe-to-drum clearance to account for lining wear. The parking brake assembly includes a strut actuator subassembly that comprises a strut tube, an electric motor, a position encoder, a power screw and a connector fork.

BACKGROUND OF THE INVENTION

Vehicle brakes are used to slow the vehicle and also to maintain the vehicle in a parked position. Drum brakes are a common type of vehicle brake. Drum brake assemblies utilize opposing arcuate brake shoes that are movable away from one another into engagement with an inner surface of a drum to slow the vehicle. Typically, a hydraulic wheel cylinder forces the brake shoes into engagement with the drum. The same brake shoes may also be used to maintain the vehicle in a parked position. For example, drum brake assemblies have employed a separate mechanical linkage, or parking brake lever, that is actuated by a cable to maintain the brake shoes in engagement with the drum. Such mechanical parking brakes have presented various problems that have been partially addressed by the use of electric parking brake mechanisms.

Some electric parking brake mechanisms have eliminated the parking brake lever and completely redesigned the drum brake assembly to incorporate an electric parking brake mechanism. These mechanisms have required high torque motors and a gearbox to generate sufficient force to apply the brakes, adding significant cost to the drum brake assembly. These high torque motors tend to be relatively large and cannot simply replace components presently included in brake drum assemblies, but instead require substantial redesign of the brake assembly package. Furthermore, high torque motors utilize a significant amount of power that is undesirable in modern vehicles.

Presently available electric brake systems have the further disadvantage that they rely on conventional brake adjustment mechanisms. Such conventional adjustment systems are mechanical and only operate when the wheels are moving in a reverse direction. In addition, neither known electric brake systems nor conventional brake systems provide real-time sensing of brake lining wear and determination of a worn brake lining condition.

Therefore, an electric parking brake assembly is needed that requires relatively little power to apply, that may be easily retrofitted into a conventional drum brake assembly, and that provides real-time adjustment of the brake shoe-to-drum clearance and sensing of brake lining wear.

SUMMARY OF THE INVENTION

The present invention is directed to an electrically and hydraulically (hereinafter referred to as "electro-hydraulic") actuated electronic parking brake assembly for a leading/trailing type automotive drum brake. The parking brake assembly includes a strut actuator subassembly that replaces conventional components including the parking brake lever, adjuster strut and associated parts, used in a standard drum brake. The strut actuator subassembly is easily incorporated into a conventional brake assembly and comprises a strut tube, an electric motor having a driveshaft, a position encoder, a power screw and a connector fork. Due to the design of the strut actuator subassembly, a low power (and low torque) motor can be used.

The brake assembly of the present invention includes a backing plate having primary and secondary shoe hold-down pin and spring assemblies with primary and secondary brake shoes. Each of the brake shoes has a portion in spaced relation from one another. A drum is disposed about the brake shoes. A wheel cylinder is supported by the backing plate and is arranged between the portions of the brake shoes for forcing the portions away from one another to engage the brake shoes with the drum in a brake position. A strut actuator subassembly, located adjacent to the wheel cylinder, interconnects the brake shoes proximate to the portions. The strut actuator subassembly comprises a strut tube, a power screw, a connector fork, an electric motor with a driveshaft and a position encoder. The strut tube has one open end having female threads along a portion of the interior and an opposing end that tapers to a two-pronged fork. The power screw has male threads along a portion of its length and an unthreaded rod portion at one end. The connector fork has an annular female receiver portion at one end suitable for receiving the rod portion of the power screw and a two-pronged fork at the other end. The electric motor and position encoder are located within the strut tube, and the electric motor is axially connected with the power screw via the driveshaft. The strut tube and the power screw connect at their respective female and male threaded ends. The power screw, at its rod end, connects to the female end of the connector fork. The forked end of the strut tube and the connector fork connect with slots in portions of each web of opposing brake shoes thereby securing the strut actuator subassembly between the opposing brake shoes. The strut tube, electric motor with driveshaft, position encoder, power screw and connector fork are in axial relationship with one another and when connected define the transverse structure of the strut actuator subassembly.

In operation of an electro-hydraulic apply parking brake of the present invention, the strut actuator subassembly serves as a parking brake latch. Hydraulic pressure is applied by the electro-hydraulic actuator to the wheel cylinder to advance the brake shoes against the drum. As the brake is applied hydraulically, the electric motor of the strut actuator subassembly is energized. The strut actuator subassembly turns the power screw to advance the connector fork and strut tube out against the hydraulically extended brake shoes. Due to the design of the power screw, it can only be driven in positive direction. Accordingly, when the hydraulic pressure to the wheel cylinder is released along with the power to the electric motor, the brake shoes become locked to against the drum. The parking brake is released by the application of a hydraulic pressure sufficient to remove the axial load on the power screw, the connector fork and the strut tube. The electric motor then re-energizes, reverses and retracts the power screw and strut tube away from the shoes allowing them to return to their predetermined disengaged position when the hydraulic pressure is removed. The connector fork returns along with the return of the brake shoes by action of the return springs.

The present invention also advantageously provides regular and precise brake adjustment and sensing of braking lining wear. During operation, the electric motor is periodically energized, such as during the ignition start cycle, causing the powers crew to turn which advances the brake shoes out until they touch the drum. The motor then reverses for a predetermined number of counts of the position encoder to obtain the desired shoe-to-drum clearance. This provides regular and precise brake adjustment. The position encoder also concurrently determines the distance that the shoe has traveled and compares it with the original brake lining position to provide a reasonable estimate of a worn out lining condition. Upon such indication of wear, the position encoder sends out a signal to notify the operator of the worn lining condition.

Accordingly, the above invention provides an electric parking brake mechanism that provides regular and precise brake adjustment and lining wear indication. The mechanism requires relatively little power to operate and may be easily incorporated, such as by retrofit, into a conventional drum brake assembly.

BRIEF DESCRIPTION OF THE DRAWINGS

Other advantages of the present invention can be understood by reference to the following detailed description when considered in connection with the accompanying drawing wherein.

DESCRIPTION OF THE PREFERRED EMBODIMENT

Figure 1:
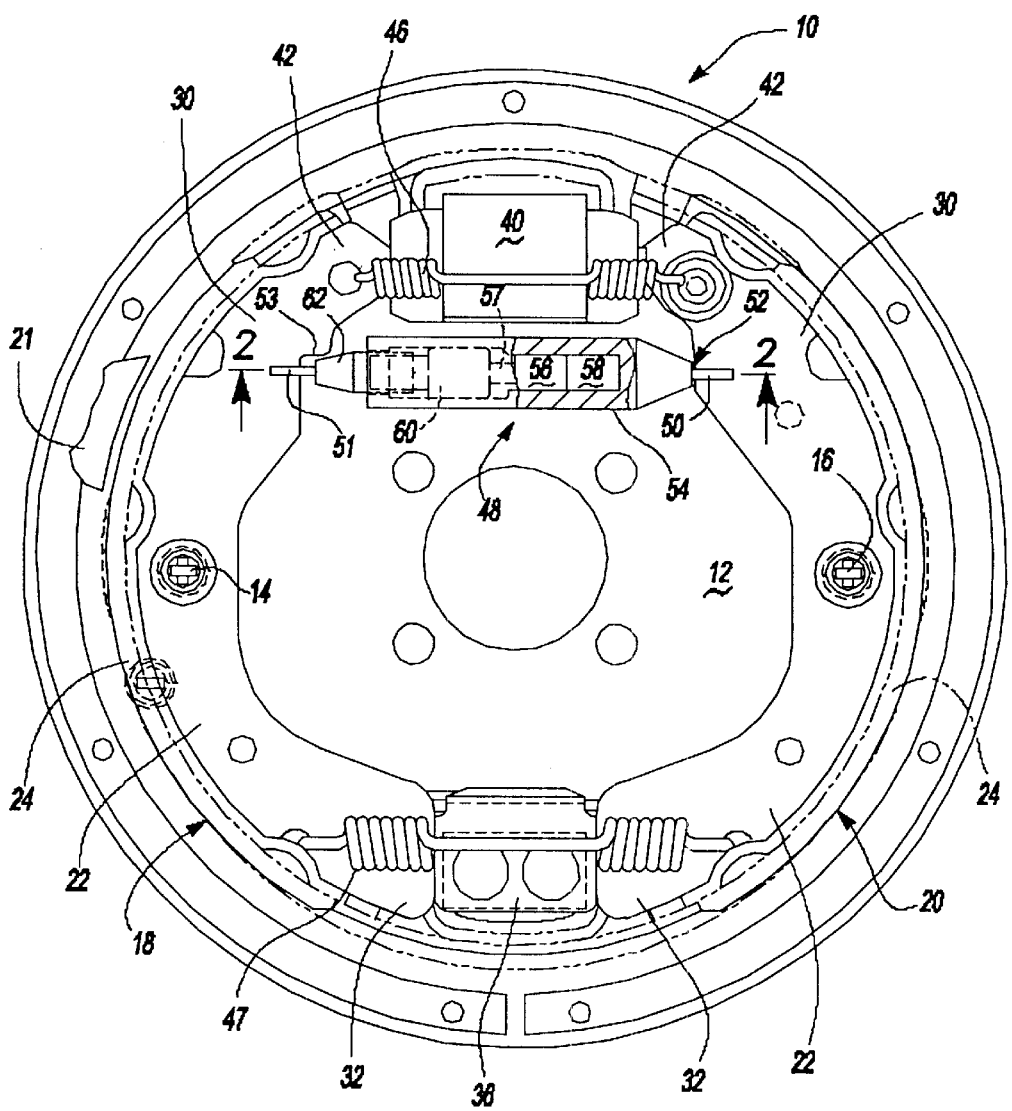
FIG. 1 is a front elevation view of a drum brake assembly of the present invention.

A drum brake assembly 10 for a vehicle is shown in FIG. 1. The assembly 10 includes a backing plate 12 having primary 14 and secondary 16 shoe hold down pin-and-spring assemblies with primary 18 and secondary 20 brake shoes supported respectively thereon. A drum 21 is disposed about the brake shoes 18, 20. Each of the brake shoes 18, 20 include brake shoe webs 22 that support friction linings 24 adjacent drum 21. Each of webs 22 has a portion 30 in spaced relation from the other that extends to a second portion 32. Preferably, an anchor block 36 is arranged between brake shoes 18, 20 to support the second portions 32 in spaced relationship to one another.

A wheel cylinder 40 is supported by backing plate 12 and is arranged between portions 30 of brake shoes 18, 20. Wheel cylinder 40 includes pistons on either end, as is well known, that move in opposite directions to force the portions 30 away from one another to engage brake shoes 18, 20 with drum 21 when in a brake position. Hydraulic fluid is forced into a chamber between the pistons by a hydraulic brake actuator. Portions 30 have ears 42 that are received in indentations in the pistons (not shown). As portions 30 are forced away from one another, brake shoes 18, 20 pivot outward about pin-and-spring assemblies 14, 16.

A strut actuator subassembly 48, located at section 2—2, is connected to slots 52, 53 in webs 22 interconnecting brake shoes 18, 20 at ends 50, 51 adjacent wheel cylinder 40 and proximate the portions 30. Opposing ends 50, 51 of the strut actuator subassembly 48 engage webs 22 to hold the portions 30 in spaced relation. Ends 50, 51 also serve to secure strut actuator subassembly 48 between brake shoes 18, 20 within brake assembly 10. Upper and lower return springs 46, 47 interconnect the portions 30 and second portions 32 for retracting brakes shoes 18, 20 from drum 21 against strut actuator subassembly 48 and anchor block 36. In this manner, anchor block 36 and strut actuator subassembly 48 together determine the spacing of brake shoes 18, 20 from drum 21. As linings 24 wear, brake shoes 18, 20 must be moved closer to drum 21 to maintain desirable brake application characteristics, such as consistent brake pedal travel and brake response time. To this end, strut actuator subassembly 48 serves as a lining wear sensor and a brake shoe-to-drum clearance adjuster to accommodate for wear in brake shoes 18, 20.

Figure 2:
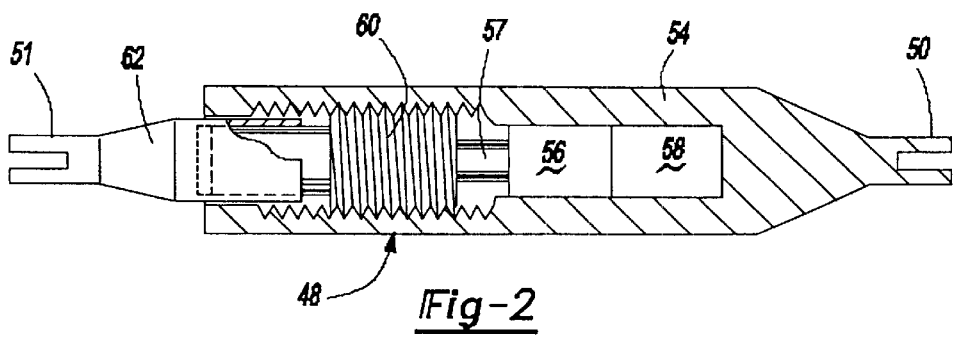
FIG. 2 is an exposed planar view of the strut actuator subassembly, located at section 2—2 of FIG. 1, showing details of the components.

Referring to FIG. 2, strut actuator subassembly 48 comprises a strut tube 54 that is open at one end having female threads and tapers to a fork at opposite end 50. Strut actuator assembly 48 further comprises an electric motor 56 with a driveshaft 57, a position encoder 58, a power screw 60 having male threads along a portion of its length and a unthreaded rod portion at one end, and a connector fork 62 having a female end suitable to receive the rod portion of the power screw and a fork at end 51. As shown in FIG. 1, electric motor 56 and position encoder 58 are located within strut tube 54. The electric motor 56 is axially connected via driveshaft 57 to power screw 60. Power screw 60 connects via its rod portion to connector fork 62 that connects at end 51 with slot 53, and strut tube 54 connects with its fork at end 50 with slot 52. In operation, the electric motor 56 turns driveshaft 57 to rotate power screw 60. Power screw 60 advances connector fork 62 and strut tube 54 in opposing directions. When electric motor 56 is operating in the positive direction, power screw 60 (with connector fork 62) and strut tube 54 move outwardly to engage brake shoes 18, 20 with drum 21. This outward movement provides for parking brake engagement, sensing of brake lining wear and determination of the shoe-to-drum distance. When the motor is operating in the reverse direction, power screw 60 and strut tube 54 move inwardly allowing the brake shoes 18, 20 to retract from drum 21 and return to their disengaged position. This inward movement provides for parking brake disengagement and adjustment of the brakes to a preselected brake shoe-to-drum clearance.

The electric parking brake of the present invention is actuated in response to a parking brake signal received from an electro-hydraulic parking brake mechanism (not shown). Hydraulic pressure is applied by an electro-hydraulic actuator (also not shown) to the wheel cylinder 40 that advances brake shoes 18, 20 against the drum 21. The electro-hydraulic actuator concurrently sends a signal to the strut actuator subassembly 48 to energize electric motor 56. Electric motor 56 turns driveshaft 57 in the positive direction moving power screw 60 (with connector fork 62) and strut tube 54 outwardly to engage the brake shoes 18, 20 with the drum 21. Because the power screw 60 cannot be driven backwards, when the hydraulic pressure to wheel cylinder 40 is released with the power to the electric motor 56, the brake shoes 18, 20 become locked against the drum 21. The parking brake is released when the electro-hydraulic actuator is re-initiated by application of a hydraulic pressure that is sufficient to remove the axial load on the power screw 60, connector fork 62 and the strut tube 54. The electric motor 56 is concurrently re-energized, reverses the direction of driveshaft 57 and retracts power screw 60 and strut tube 54, allowing brake shoes 18, 20 to return to a disengaged position.

Brake lining wear sensing and adjustment are also controlled by the strut actuator subassembly 48. Upon brake installation, position encoder 58 records the original position of the brake shoes according to the pre-selected brake-to-drum clearance. Then, during operation, the electric motor 56 is periodically energized, such as during the ignition start cycle, causing the power screw 60 (with connector fork 62) and the strut tube 54 to move outwardly and advance the brake shoes 18, 20 out until they touch the drum 21. The electric motor 56 then reverses for a predetermined number of counts according to position encoder 58 to obtain the desired shoe-to-drum clearance. The position encoder 58 concurrently determines the distance that brake shoes 18, 20 have traveled and compares it with the original set-point position. The position encoder 58 outputs a signal to notify the operator of a worn brake lining condition when a predefined point is reached.

In the present invention, electric motor 56 is preferably a low power, low torque motor since it need only generate enough force to move the weight of the brake shoes 18, 20 against the resistance of return spring 46 to touch drum 21.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. An electrically actuated strut actuator subassembly for an electro-hydraulically applied parking brake in an automotive drum brake for use in engaging or disengaging a parking brake, sensing brake lining wear and adjusting brake shoe-to-drum clearance that has a backing plate, brake shoes that are supported on said backing plate, a brake drum disposed about said brake shoes, a hydraulic wheel cylinder mounted to said backing plate, return springs connecting said brake shoes at upper portions and lower portions and a strut actuator subassembly located parallel to said wheel cylinder and mounted between webs in slots that interconnects said upper portions between ends, wherein said strut actuator subassembly comprises, a strut tube having female threads and tapering to a fork at another end, a power screw having male threads and a rod portion at one end, a connector fork having a female portion at one end suitable for receiving said rod portion of said power screw and a fork at another end, a low power electric motor having a driveshaft at one end, and a position encoder, that are all in a common axial relationship with one another and wherein said strut tube and said power screw are connected by said female and male threads and said rod portion of said power screw is connected to said connector fork at said female portion to define the transverse structure of said strut actuator subassembly, and further wherein said electric motor and said position encoder are connected to one another and located within the interior of said strut tube and said electric motor is further connected to said power screw by said driveshaft, so that upon actuation of said electric motor, said driveshaft turns said power screw that advances said connector fork in one direction and said strut tube in an opposing direction along the axis of connection to engage or disengage said brake shoes with said brake drum for activating or deactivating said parking brake, sensing brake lining wear, or adjusting brake shoe-to-drum clearance.

2. The strut actuator subassembly of claim 1 wherein said position encoder comprises a controller for adjusting said brake shoe-to-drum clearance.

3. The strut actuator subassembly of claim 2 wherein said position encoder further comprises means to determine a worn lining condition.

4. The strut actuator subassembly of claim 1 wherein upon parking brake activation, said electric motor turns said driveshaft and said power screw advancing said connector fork and said strut tube in opposing directions along said axis outwardly to engage said brake shoes with said brake drum.

5. The strut actuator subassembly of claim 1 wherein upon parking brake deactivation, said electric motor turns said driveshaft retracting said power screw and said strut tube in opposing directions along said axis inwardly to disengage said brake shoes from said brake drum.

6. The strut actuator subassembly of claim 1 wherein said electric motor periodically turns said driveshaft and said power screw and moves said connector fork and said strut tube in opposing directions along said axis to touch and retract said brake shoes with said brake drum for sensing of said brake lining wear.

7. The strut actuator subassembly of claim 6 wherein said brake shoes are retracted from said brake drum to a predetermined distance to adjust said brake shoe-to-drum clearance.

* * * * *